United States Patent [19]
Leising et al.

[11] Patent Number: 5,193,060
[45] Date of Patent: Mar. 9, 1993

[54] METHOD OF HOLD-SPEED CONTROL DURING AN UPSHIFT

[76] Inventors: Maurice B. Leising, 877 Key West Dr., Clawson, Mich. 48017; Gerald L. Holbrook, 866 Downhill La., Rochester Hills, Mich. 48063

[21] Appl. No.: 351,895

[22] Filed: May 12, 1989

[51] Int. Cl.$^5$ ............................................. B60K 41/04
[52] U.S. Cl. .................................. 364/424.1; 74/866
[58] Field of Search ..................... 364/424.1; 74/866

[56] References Cited

U.S. PATENT DOCUMENTS

| | | | |
|---|---|---|---|
| 4,967,356 | 10/1990 | Mori | 364/424.1 |
| 4,969,098 | 11/1990 | Leising et al. | 364/424.1 |
| 4,975,845 | 12/1990 | Mehta | 364/424.1 |

Primary Examiner—Vincent N. Trans
Attorney, Agent, or Firm—Mark P. Calcaterra

[57] ABSTRACT

A method of controlling the hold-speed during an upshift of an automatic transmission for a vehicle. The method controls the level of slip through the reapplication of the release element in response to predetermined conditions which include a determination of whether the second derivative of slip has exceeded a particular limit.

2 Claims, 2 Drawing Sheets

METHOD OF HOLD-SPEED CONTROL DURING AN UPSHIFT

BACKGROUND OF THE INVENTION

1. Field of the Invention

The present invention relates generally to an automatic transmission primarily intended for motor vehicle use, and more particularly, to a method of hold-speed control during an upshift for a transmission that is controlled electronically and hydraulically.

2. Description of Related Art

In recent years, an advanced form of transmission control has been proposed, which offers the possibility of enabling an automatic transmission to adapt itself to changing conditions. In this regard, U.S. Pat. No. 3,956,947, issued on May 18, 1976 to Leising, et al., sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control, the automatic transmission would be "responsive" to an acceleration factor for controlling the output torque of the transmission during a shift from one ratio of rotation (between the input and output shafts of the transmission) to another. Specifically, the operation of solenoid-actuated valves would cause a rotational speed versus time curve of a sensed rotational component of the transmission to substantially follow along a predetermined path during shifting.

Currently, there exists a comprehensive four-speed automatic transmission system which features fully adaptive electronic control. An example of such a transmission control system is disclosed in copending application, Ser. No. 187,772, filed Apr. 29, 1989 and entitled "AN ELECTRONICALLY-CONTROLLED, ADAPTIVE AUTOMATIC TRANSMISSION SYSTEM" by inventors Leising et al, which is commonly owned by the assignee of the present application. The transmission control system includes a microcomputer-based controller which receives input signals indicative of engine speed, turbine speed, output speed (vehicle speed), throttle angle position, brake application, predetermined hydraulic pressures, driver selected gear or operating condition (PRNODDL), engine coolant temperature, and/or ambient temperature. This controller generates command or control signals for causing the actuation of a plurality of solenoid-actuated valves which regulate the application and release of pressure to and from the frictional units of the transmission system. Accordingly, the controller with execute predetermined shift schedules stored in the memory of the controller through appropriate command signals to the solenoid-actuated valves and the feedback which is provided by various input signals.

Whenever the automatic transmission for the above control system is operating in an in-gear condition (i.e., reverse, 1st, 2nd, 3rd, or 4th gear), there is a specific known ratio that exists between the transmission's input and output shaft speeds for the given in-gear condition. Input and output speed sensors of the transmission are continuously being monitored to provide the controller with the speed data necesary to perform various control tasks. Significantly important to good shift quality with adaptive controls is the ability to rapidly identify when a friction element begins to slip during a shift. This slip is typically identified whenever the calculated input speed is different than the product of the current gear ratio times the calculated output speed by a predetermined amount called "in-gear-tolerance (IGT)".

Previously, logic was used to control a small amount of slip in the releasing element. This logic used turbine speed and turbine acceleration (2nd derivative of speed) for the control.

It is, therefore, one object of the present invention to provide a method of determining and controlling the hold-speed during an upshift.

It is another object of the present invention to determine the second derivative of slip.

It is a further object of the present invention to turn OFF control applications as close to the controlled level of slip as possible.

SUMMARY OF THE INVENTION

To achieve the foregoing objects, the present invention is an algorithm or logic based method which is used to turn OFF control level applications as close as possible to the controlled level of slip during a shift. This is essentially accomplished by calculating the second derivative of slip and then turning OFF a solenoid-actuated valve for the release element.

One advantage of the present invention is that the use of solely turbine speed and acceleration is eliminated. A further advantage of the present invention is that the second derivative provides substantially better hold-speed control during an upshift. Other advantages of the present invention will be readily appreciated as the same becomes better understood after reading the following description when considered in connection with the accompanying drawings.

BRIEF DESCRIPTION OF THE DRAWINGS

FIG. 2 is a graph of slip versus time for the methodology of

DESCRIPTION OF THE PREFERRED EMBODIMENT

The methodology of the present invention can be used or incorporated in a transmission system as disclosed in copending application, Ser. No. 187,772, filed Apr. 29, 1989, entitled "AN ELECTRONICALLY-CONTROLLED, ADAPTIVE AUTOMATIC CONTROL SYSTEM" by inventors Leising et al, which is hereby incorporated by reference.

Figure 1:
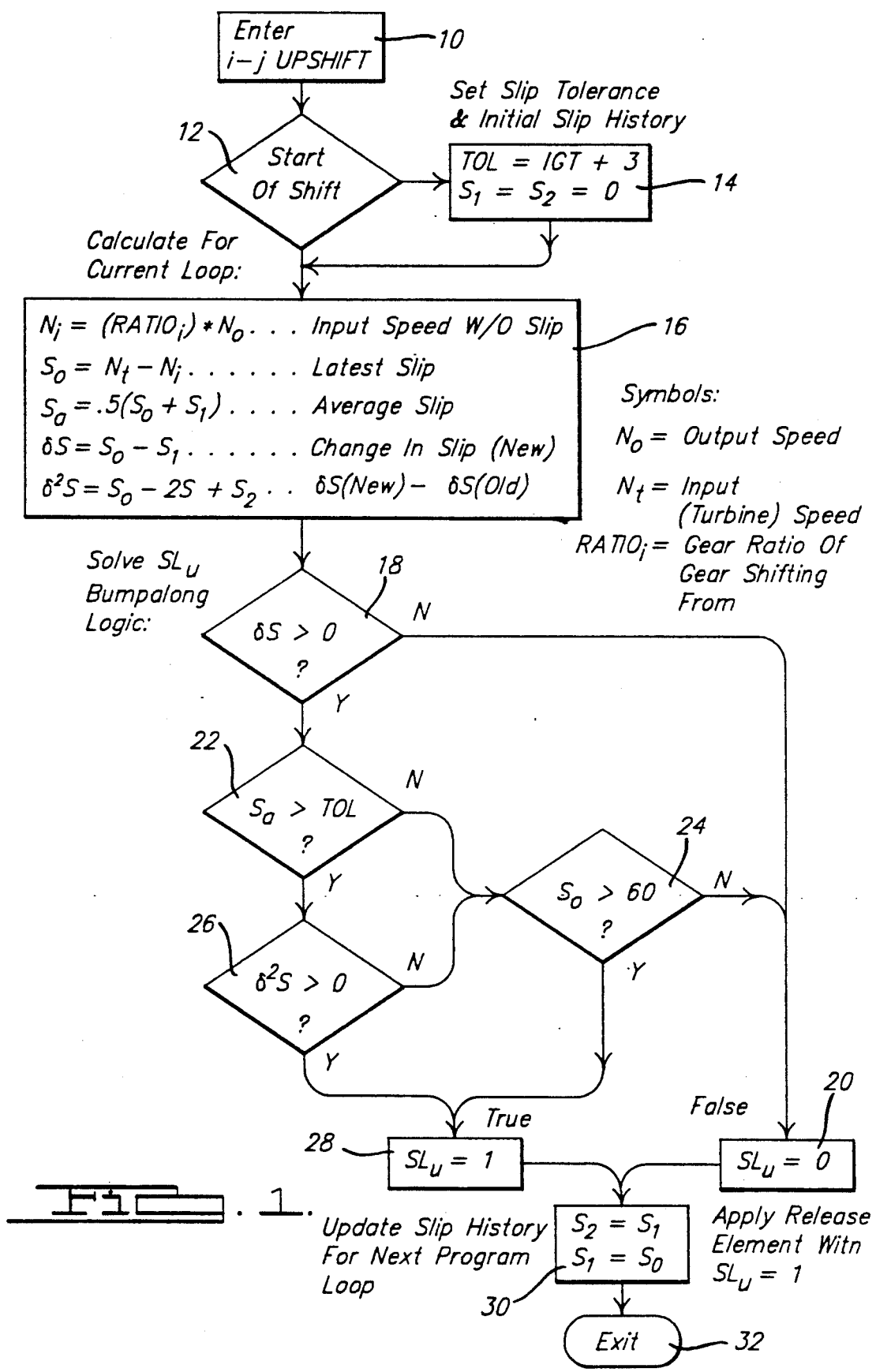
FIG. 1 is a detailed flow chart of a hold-speed control methodology according to the present invention.

Referring to FIG. 1, a flow chart for the shift logic upshift (SLU) or third derivative logic used for upshift hold-speed control is shown. The methodology begins in block 10 and advances to diamond 12. In diamond 12, the methodology determines whether it is the start of a shift by looking for a flag for example. If so, the methodology advances to block 14 and sets a slip tolerance (TOL) variable equal to an in-gear tolerance (IGT) plus a first predetermined value such as three (3) r.p.m. The methodology also sets the initial slip history $S_1$ and $S_2$ equal to a second and third predetermined value such as zero. The methodology advances from block 14 to block 16 to be described. Also, if it is not the start of a shift, the methodology advances to block 16.

In block 16, the methodology calculates a value for a plurality of variables for the current or present loop such as input speed without slip ($N_i$), latest slip ($S_o$), average slip ($S_a$), change in slip (delta S), and the derivative of the change in slip (delta squared S). The variables are calculated according to the following equations:

$N_i = (RATIO_i) * N_o$, where $RATIO_i$ is the gear ratio of gear shifting from and $N_o$ is the output speed $S_o = N_t - N_i$ where $N_t$ is the input (turbine) speed $S_a = 0.5(S_o + S_1)$ where 0.5 is a predetermined value delta $S = S_o - S_1$ delta $^2S = S_o - 2S_1 + S_2$ which is delta $S_{(NEW)}$ − delta $S_{(OLD)}$.

Once the values for the variables are calculated in block 16, the methodology advances to diamond 18.

In diamond 18, the methodology determines whether delta S calculated in block 16 is greater than a predetermined value such as zero. If not, the methodology advances to block 20 and sets slip during an upshift variable $SL_u$ equal to a predetermined value such as zero to turn OFF the release element, i.e. not apply the release element. If so, the methodology advances to diamond 22 and determines whether the average slip $S_a$ calculated in block 16 is greater than the value of a tolerance variable TOL. If $S_a$ is not greater than TOL, the methodology advances to diamond 24 to be described. If $S_a$ is greater, the methodology advances to diamond 26 and determines whether the second derivative of slip delta $^2S$ calculated in block 16 is greater than a predetermined value such as zero. If not, the methodology advances to diamond 24 to be described. If so, the methodology advances to block 28 and sets $SL_u$ equal to a predetermined value such as one (1) to reapply the release element to achieve bump-along or hold-speed control.

In diamond 24, the methodology determines whether the current slip $S_o$ calculated in block 16 is greater than a predetermined value such as sixty (60). If not, the methodology advances to block 20 previously described to set $SL_u$ equal to zero. If so, the methodology advances to block 28 previously described and sets $SL_u$ equal to one to reapply the release element to achieve bump-along control.

From blocks 20 and 28, the methodology advances to block 30 and updates the slip history for the next loop of the methodology. The methodology sets $S_2$ equal to $S_1$ and $S_1$ equal to $S_o$. The methodology then advances from block 30 to bubble 32 and exits or returns.

In-Gear Tolerance (IGT) logic is used to set a limit as close as possible to the initial no-slip speed; a two-reading average is used to prevent false slip identification due to possible signal noise. The IGT logic is disclosed in a related application entitled "METHOD OF IN-GEAR TOLERANCE CONTROL" filed on the same data as the present application and commonly owned and hereby incorporated by reference. A theoretical analysis indicates that when the second derivative of slip goes negative, it means that the release element pressure is rising, thus indicating that the release element solenoid has responded to the apply signal. The solenoid, therefore, is given a release signal with the negative second derivative signal, providing that slip is not too high. This has been shown to provide substantially better hold-speed control than previous logic.

Figure 2:
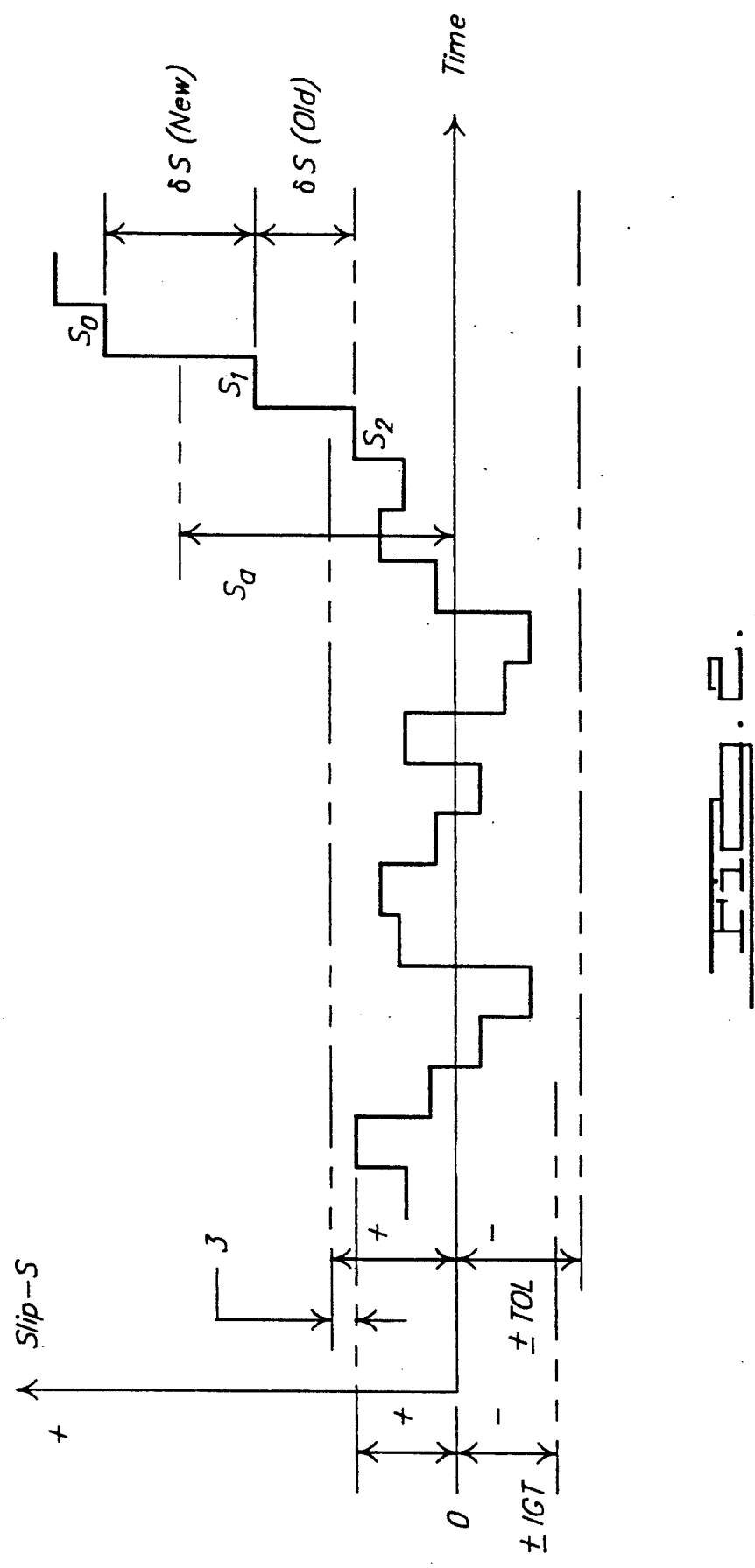

Referring to FIG. 2, a graph of slip(s) versus time is shown for an upshift. IGT logic, although not necessary, helps identify the point of slip much sooner and is updated to the point of the shift as indicated by $S_o$. The slip eventually begins to increase above TOL. The methodology computes and maintains a history of the current movement two loops back, which is indicated by $S_1$ and $S_2$. The methodology computes an average slip in time $S_a$, which is equal to the current value of slip and the average of the previous loop's slip and the current slip. The methodology compares that value against TOL to see if the average is greater than TOL for purposes of rapid reapplication of the release element.

The present invention has been described in an illustrative manner. It is to be understood that the terminology is in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. In a vehicle having a transmission including an input member, an output member, a gear assembly for changing a ratio of torque between said input member and said output member, a plurality of friction elements for shifting said gear assembly, a plurality of input sensors for providing signals indicative of a current slip of said transmission, and a controller having memory for processing and storing said signals, storing predetermined slip conditions and providing output signals, a method of controlling a hold-speed during an upshift of said gear assembly to enable said transmission to rapidly respond to dynamic slip condition of a start of the transmission upshift, said method comprising the steps of:
   (a) determining whether said transmission is at the start of said upshift;
   (b) if said transmission is determined to be at the start of said upshift, calculating the magnitudes of current slip parameters including a slip between said input and said output members of said transmission, an average slip, a change in slip and a change in the change in slip;
   (c) comparing the magnitudes of said current slip parameters against said predetermined slip conditions; and
   (d) reapplying at least one of said friction elements of said transmission if certain of said current slip parameters satisfy said predetermined slip conditions.

2. The method of claim 1 wherein step (c) comprises:
   comparing the magnitude of said change in slip to a first predetermined value to determine if said change in slip is greater than said first predetermined value;
   if the magnitude of said change in slip is greater than said first predetermined value, comparing the magnitude of said average slip to a second predetermined value to determine if said average slip is greater than said second predetermined value;
   if the magnitude of said average slip is greater than said second predetermined value, comparing the magnitude of said change in the change in slip to a third predetermined value to determine if the change in the change in slip is greater than the third predetermined value.

* * * * *

UNITED STATES PATENT AND TRADEMARK OFFICE
CERTIFICATE OF CORRECTION

PATENT NO. : 5,193,060
DATED : March 9, 1993
INVENTOR(S) Maurice B. Leising, et. al.

It is certified that error appears in the above-indentified patent and that said Letters Patent is hereby corrected as shown below:

On the Title page, item [73], insert -- Chrysler Corporation--.

Signed and Sealed this

Seventeenth Day of May, 1994

Attest:

BRUCE LEHMAN

*Attesting Officer*     *Commissioner of Patents and Trademarks*